(12) United States Patent
Holowaty et al.

(10) Patent No.: US 12,254,311 B2
(45) Date of Patent: Mar. 18, 2025

(54) AUTOMATIC EXTRACT, TRANSFORM AND LOAD ACCELERATOR FOR DATA PLATFORM IN DISTRIBUTED COMPUTING ENVIRONMENT

(71) Applicant: INTERNATIONAL BUSINESS MACHINES CORPORATION, Armonk, NY (US)

(72) Inventors: Andrew Allen Holowaty, Dublin, OH (US); Pradeep Kumar Raghunath, Aurora, IL (US); Arpan B Desai, Murphy, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 164 days.

(21) Appl. No.: 17/586,944

(22) Filed: Jan. 28, 2022

(65) Prior Publication Data

US 2023/0244475 A1 Aug. 3, 2023

(51) Int. Cl.
*G06F 8/71* (2018.01)

(52) U.S. Cl.
CPC ...................................... *G06F 8/71* (2013.01)

(58) Field of Classification Search
CPC ......................................................... G06F 8/71
See application file for complete search history.

(56) References Cited

U.S. PATENT DOCUMENTS

| | | | |
|---|---|---|---|
| 5,987,598 A * | 11/1999 | Levine | G06F 11/302 714/E11.2 |
| 6,047,260 A | 4/2000 | Levinson | |
| 7,051,146 B2 * | 5/2006 | Nguyen | G06F 9/3885 712/E9.046 |
| 7,139,779 B1 | 11/2006 | Kornelson et al. | |
| 7,155,704 B2 * | 12/2006 | Williams | G06F 11/0724 714/E11.069 |
| 7,644,256 B2 * | 1/2010 | Nordmark | G06F 9/3875 712/228 |
| 8,024,369 B2 | 9/2011 | Pellegrini et al. | |

(Continued)

FOREIGN PATENT DOCUMENTS

| | | |
|---|---|---|
| CN | 109359146 A | 2/2019 |
| CN | 111309790 A | 6/2020 |
| CN | 111930819 A | 11/2020 |

OTHER PUBLICATIONS

Mell, Peter, et al., "The NIST Definition of Cloud Computing," Sep. 2011, 7 pages.

*Primary Examiner* — Douglas M Slachta
(74) *Attorney, Agent, or Firm* — Tutunjian & Bitetto, P.C.; Edward Wixted

(57) ABSTRACT

A software development accelerator tool having an automatic extract, transform and load accelerator is described that can be employed for building, testing, deploying and managing software applications and services. Employ the accelerator can include selecting software development operations from a multiplicity of preconfigured existing operations; ordering operations as part of a configuration; determining whether dependencies are met for operations before processing the configuration; generating a batch ID to track the processing; and performing operations in the order specified in the configuration.

20 Claims, 10 Drawing Sheets

(56) References Cited

U.S. PATENT DOCUMENTS

| | | | | |
|---|---|---|---|---|
| 8,266,624 | B2* | 9/2012 | Eigler | G06F 9/4843 |
| | | | | 717/124 |
| 8,335,758 | B2* | 12/2012 | Chang | G06F 16/254 |
| | | | | 707/602 |
| 10,091,283 | B2* | 10/2018 | Zhao | H04L 43/10 |
| 10,176,546 | B2* | 1/2019 | Nystad | G06F 9/3888 |
| 10,310,896 | B1* | 6/2019 | Kichak | G06F 9/4843 |
| 10,795,935 | B2* | 10/2020 | Bequet | G06F 16/9014 |
| 10,936,321 | B2* | 3/2021 | Feiste | G06F 9/30145 |
| 11,119,989 | B1* | 9/2021 | Dance | G06F 16/283 |
| 11,132,213 | B1* | 9/2021 | Wagner | G06F 9/5038 |
| 11,455,190 | B2* | 9/2022 | Bequet | G06F 9/4881 |
| 11,500,673 | B2* | 11/2022 | Taher | G06F 9/485 |
| 11,915,044 | B2* | 2/2024 | Jose, Jr. | G06F 9/542 |
| 2012/0054147 | A1 | 3/2012 | Goetz et al. | |
| 2012/0278595 | A1* | 11/2012 | Indukuru | G06F 9/3867 |
| | | | | 712/219 |
| 2014/0281402 | A1* | 9/2014 | Comparan | G06F 9/3861 |
| | | | | 712/214 |
| 2015/0220342 | A1* | 8/2015 | Glossner | G06F 9/3853 |
| | | | | 712/216 |
| 2015/0220347 | A1* | 8/2015 | Glossner | G06F 9/3885 |
| | | | | 712/215 |
| 2016/0011877 | A1* | 1/2016 | Mukherjee | G06F 9/384 |
| | | | | 712/208 |
| 2016/0217016 | A1* | 7/2016 | Raman | G06F 9/4806 |
| 2017/0039239 | A1* | 2/2017 | Saadat-Panah | H04L 67/1023 |
| 2017/0075721 | A1* | 3/2017 | Bishop | G06F 9/4881 |
| 2017/0075966 | A1* | 3/2017 | Greene | G06F 16/254 |
| 2018/0074852 | A1* | 3/2018 | Bishop | G06F 9/542 |
| 2018/0300116 | A1* | 10/2018 | Meytin | H04L 67/10 |
| 2019/0129972 | A1* | 5/2019 | Borate | G06F 16/122 |
| 2020/0387377 | A1* | 12/2020 | Tseng | G06F 9/3853 |
| 2021/0224051 | A1* | 7/2021 | Bequet | G06F 9/45533 |
| 2021/0349814 | A1* | 11/2021 | Joshi | G06F 11/3688 |
| 2021/0397445 | A1* | 12/2021 | Ahuja | H04L 9/3239 |
| 2022/0261281 | A1* | 8/2022 | Bequet | G06N 3/084 |
| 2023/0041906 | A1* | 2/2023 | Haile | G06F 11/3006 |
| 2023/0131898 | A1* | 4/2023 | Willett | G06F 3/0482 |
| | | | | 707/803 |
| 2023/0164082 | A1* | 5/2023 | Adogla | H04L 47/20 |
| | | | | 370/235 |
| 2023/0205770 | A1* | 6/2023 | Breß | G06F 16/27 |
| | | | | 707/718 |

* cited by examiner

AUTOMATIC EXTRACT, TRANSFORM AND LOAD ACCELERATOR FOR DATA PLATFORM IN DISTRIBUTED COMPUTING ENVIRONMENT

BACKGROUND

The present invention generally relates to managing distributed computing, and more particularly to extract, transform and load (ETL) tools in data platforms.

Generally, when companies implement a MICROSOFT® AZURE™ native solution for data, they use AZURE DATA FACTORY™ (ADF). Because AZURE™ is a popular cloud platform, many companies are implementing data solutions with AZURE DATA FACTORY™ (ADF), because it is a platform as a service (PaaS) type of service. In some instances, when working with AZURE DATA FACTORY™ (ADF), the pattern is to create a pipeline for each dataset that an analytical solution uses. In some instances, large implementations can use thousands of datasets. No other options for AZURE DATA FACTORY™ (ADF) are available to solve the complexity for the need to develop and test new pipelines when introducing new data sets to an analytical solution.

SUMMARY

In accordance with an embodiment of the present invention, a computer implemented method, system and computer program product are described for providing a software development accelerator tool for building, testing, deploying and managing software applications and services.

In one aspect, a computer implemented method is provided that can include selecting software development operations from a multiplicity of preconfigured existing operations. The operations can then be ordered as part of a configuration. In a following step, the method can include determining whether dependencies are met for the operations before processing the configuration. The method can gen generate a batch ID to track the processing. Operations can then be performed in the order specified in the configuration.

In another aspect, a system is described that for providing a software development accelerator tool that can be employed for building, testing, deploying and managing software applications and services. The system can include a hardware processor; and a memory that stores a computer program product. The computer program product when executed by the hardware processor, causes the hardware processor to select software development operations from a multiplicity of preconfigured existing operations, and then order the operations as part of a configuration. The computer program product can also determine whether the dependencies for operations have been met before processing the configuration; and can generate a batch ID to track the processing. Operations can then be performed in the order specified in the configuration.

In yet another aspect, a computer program product is described for providing a software development accelerator tool that can be employed for building, testing, deploying and managing software applications and services. The computer program product can include a computer readable storage medium having computer readable program code embodied. The program instructions are executable by a processor to cause the processor to select software development operations from a multiplicity of preconfigured existing operations, and then order the operations as part of a configuration. The computer program product can also determine, using the processor, whether dependencies are met for operations before processing the configuration; and generate a batch ID to track the processing. Operations can then be performed using the processor in the order specified in the configuration.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
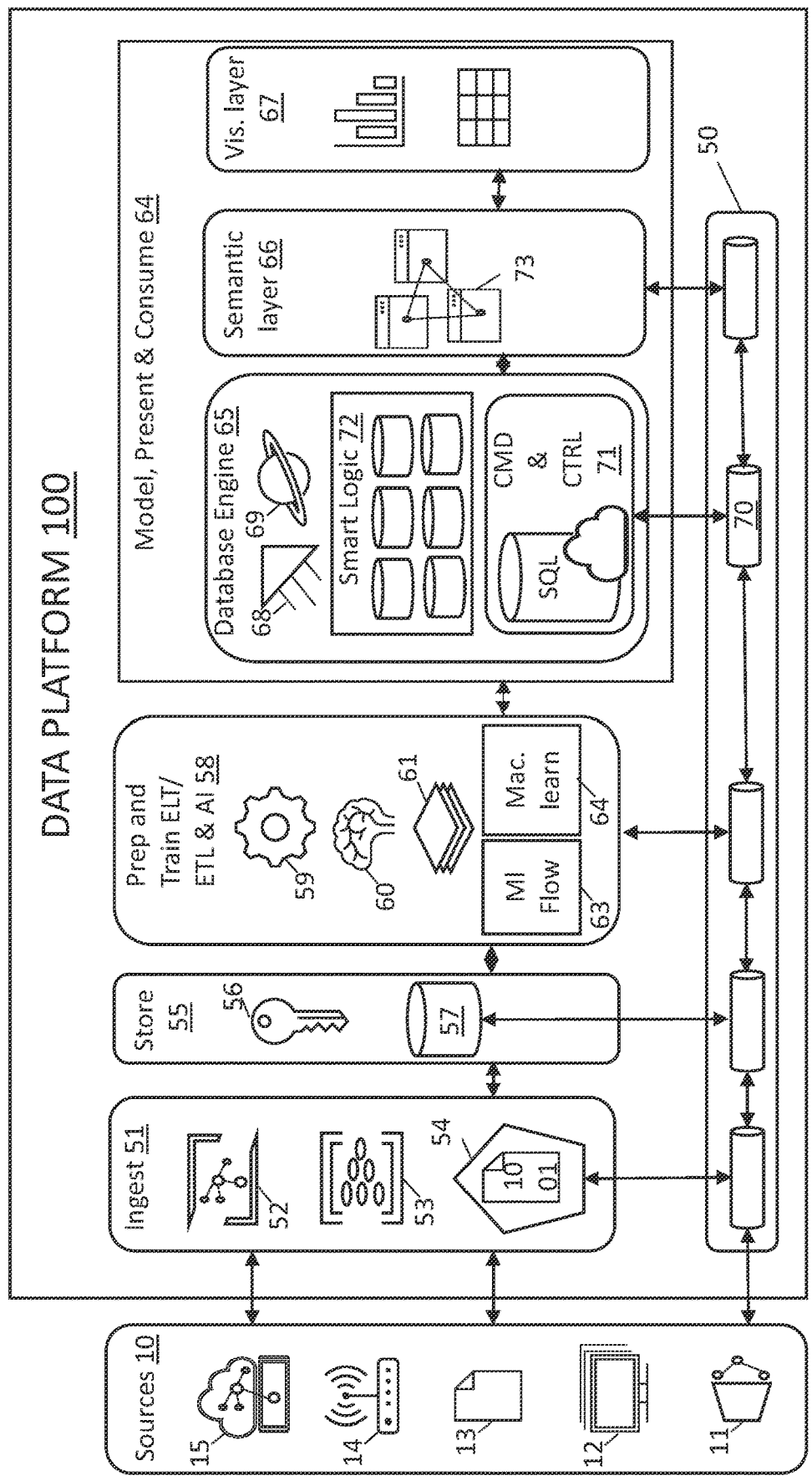
FIG. 1 is an illustration of an exemplary environment for employing a data platform end to end with an auto-ETL accelerator, in accordance with one embodiment of the present disclosure.

The methods, systems and computer program products described herein are directed to implementing an automatic extract, transformation and loading (ETL) accelerator in an end to end data platform.

AZURE DATA FACTORY™ is Azure's cloud ETL service for scale-out serverless data integration and data transformation. ETL stands for extract, transform, and load and is a way for organizations to combine data from multiple systems into a single database, data store, data warehouse, or data lake. ETL can be used to store legacy data, or aggregate data to analyze and drive business decisions. ETL describes the end-to-end process by which a company takes its full breadth of data—structured and unstructured and managed by any number of teams from anywhere in the world—and gets it to a state where it is useful for business purposes. ETL solutions must cope with the accelerating volume and speed of data. Additionally, the ability to ingest, enrich, and manage transactions, and support both structured and unstructured data in real time from any source—whether on-premises or in the cloud—can be requirements for today's enterprise ETL solutions. "Extraction" is the process of retrieving data from one or more sources—online, on-premises, legacy, SaaS, or others. After the retrieval, or extraction, is complete, the data is loaded into a staging area. "Transformation" involves taking that data, cleaning it, and putting it into a common format, so it can be stored in a targeted database, data store, data warehouse, or data lake. Cleaning typically involves taking out duplicate, incomplete, or obviously erroneous records. "Loading" is the process of inserting that formatted data into the target database, data store, data warehouse, or data lake.

Using AZURE DATA FACTORY™ a data pipeline is created for each dataset an analytical solution uses. Large implementations can use thousands of datasets. For example, an entity, such as a financial institution, can have close to 10,000 tables that need to be migrated and updated on a regular basis. Under existing processes, this can take multiple hours, e.g., 4 hours or greater, for development and testing depending on the number and complexity of operations that are needed to perform on a dataset. The methods, systems and computer program products of the present disclose provide a Data Platform End to End with an Auto Extraction, Transformation, Loading (ETL) accelerator. In some embodiments, the auto ETL accelerator take the most common operations, e.g., the ten (10) most common operations, that a pipeline case use, and drives it by a configuration eliminating the need for development and reduces the testing for data pipelines. Additionally, the operations that are selected for being most common can have derivatives on how they function. For example, five derivatives on each of the common operations can be selected based on how they function and can be employed in the auto ETL accelerator. The auto ETL accelerator described herein solves the complexity of the need to develop and test a new pipeline when introducing new datasets to analytical solutions. In some embodiments, the auto ETL accelerator eliminates the need to repetitively create new pipelines over and over again. The auto ETL accelerator also reduces the need for maintenance because the logic is in a finite set of AZURE DATA FACTORY™ pipelines that control many datasets that flow through the AZURE™ data platform ecosystem.

The methods, systems and computer program products are now described in greater detail with reference to FIGS. 1-10.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is an illustration of an exemplary environment for employing the data platform end to end with auto-ETL accelerator, in accordance with one embodiment of the present disclosure. Although the data platform 10 may be the AZURE™ data platform, the present disclosure is not limited to only this example. The data platform 100 may include a plurality of layers. The layers can include the inject layer 51, the storage layer 55, the preparation and train ELT/ETL and artificial intelligence layer 58 and the model, present and consume layer 64. The different layers of the data platform may be in communication through data pipelines 50, e.g., one or more data pipelines 50. The data pipeline 50 of the methods, systems and computer program products that are described herein can employ the automatic ETL accelerator 70 to reduce the number of pipelines for data transfer as well as reducing the complexity of configuring new pipelines for data.

FIG. 1 illustrates a number of sources 10 to the data platform 100. A data platform, e.g., AZURE™ data platform 100 is an integrated set of technologies that collectively meets an organization's end-to-end data needs. The data platform enables the acquisition, storage, preparation, delivery, and governance of your data, as well as a security layer for users and applications.

The sources 10 can include cloud-based services 11 that help organizations share and manage content and applications. The sources 10 can include enterprise systems 12. Enterprise systems 12 can include computing systems that can handle large volumes of data and enable organizations to integrate and coordinate their business processes. Examples of enterprise systems 12 can include systems for enterprise resource planning, systems for supply chain management and systems for customer relationship management. The sources 10 can also include sensors 14. There is a multitude of different sensor 14 types, such as position sensors, pressure sensors, temperature sensors and load and force sensors. The sources 10 can also include internet of things (IoT) edge devices 15. An edge device is a device that provides an entry point into enterprise or service provider core networks. Examples include routers, routing switches, integrated access devices, multiplexers, and a variety of metropolitan area network and wide area network access devices.

The sensors/devices for the sources 10 can be connected to the cloud and ultimately to the data platform 100 through a variety of methods including: cellular, satellite, WiFi, Bluetooth, low-power wide-area networks (LPWAN), or connecting directly to the internet via ethernet. For example, data from sources 10 can be delivered to the azure data platform 100 by streaming data over the internet. The data may also be sent by file copying, e.g., server push. Push technology, or server push, is a style of Internet-based communication where the request for a given transaction is initiated by the publisher or central server. It is contrasted with pull/get, where the request for the transmission of information is initiated by the receiver or client. Other network share options are also possible for the transfer of data from the sources 10 to the data platform 100.

Figure 2:
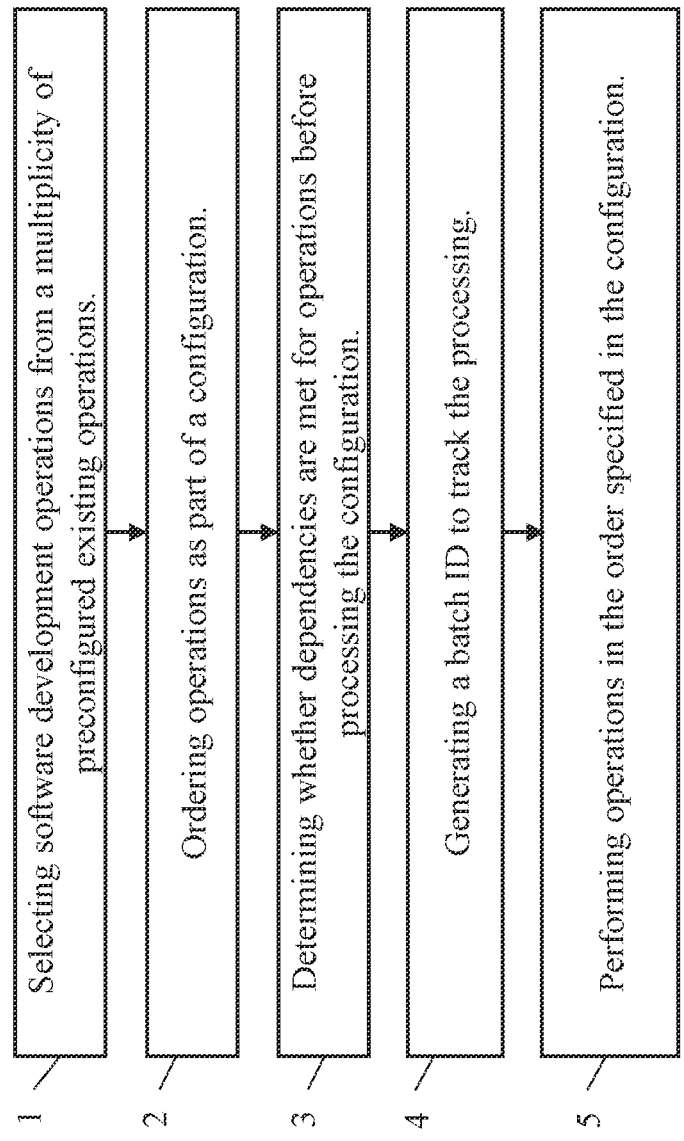
FIG. 2 is a flow chart/block diagram illustrating a method for implementing a data platform end to end with auto-ETL accelerator, in accordance with one embodiment of the present disclosure.

Each of the sources 10 depicted in FIG. 2 may produce data that can result in a new data pipeline to the data platform 100.

The methods, systems and computer program products of the present disclose provide a Data Platform End to End with an Auto Extraction, Transformation, Loading (ETL) accelerator 70. In some embodiments, the auto ETL accelerator 70 take the most common operations, e.g., the ten (10) most common operations, that a pipeline 50 can use, and drives it by a configuration eliminating the need for development and reduces the requirements of testing.

Additionally, these operations employed as being most common can have derivatives on how they function. For example, five derivatives on each of the common operations based on how they function can be employed in the auto ETL accelerator 70. The auto ETL accelerator 70 described herein solves the complexity of the need to develop and test a new pipeline when introducing new datasets to analytical solutions. In some embodiments, the auto ETL accelerator 70 eliminates the need to repetitively create new pipelines over and over again. The auto ETL accelerator 70 also reduces the need for maintenance because the logic is in a finite set of Azure Data Factory (ADF) pipelines that control many datasets that flow through the AZURE™ data platform ecosystem.

The data platform 100 includes an interface for receiving the data from the sources 100. For example, the ingest interface layer 51 of the data platform 100 may include an IoT hub 52, event hub 53, as well as an event hub for Kafka. The ingest interface layer 51 may also include an AZURE™ blob storage 54. The IoT hub 52 can be a managed service hosted in the cloud that acts as a central message hub for communication between an IoT application and its attached devices. Millions of devices and their backend solutions can be connected to the azure data platform 100 reliably and securely through the IoT hub 52. Almost any device can be connected to an IoT Hub 58. The ingest interface 51 of the data platform 100 can also include an event hub 53. Event hubs 53 are scalable telemetry services offering one-way communication with the HTTP/AMQP protocol. Event Hubs 53 are a data ingestion service that streams a huge count of messages from any source to provide an immediate response to business challenges. The event hub for Kafka provides an endpoint compatible with the APACHE KAFKA® producer and consumer APIs that can be used by most existing Apache Kafka client applications.

The ingest interface layer 51 can also include blob storage 54. Blob storage is a feature in MICROSOFT® AZURE™ that lets developers store unstructured data in Microsoft's cloud platform. This data can be accessed from anywhere in the world and can include audio, video and text. Blobs are grouped into "containers" that are tied to user accounts. "Blob" stands for Binary Large Object, which includes objects such as images and multimedia files. These are known as unstructured data because they don't follow any particular data model. In some embodiments, the files (photos, videos, training documents, etc.), which are known as blobs, are put in containers which function similar to directories. These are then linked to the storage account. When creating the address to give access to a file in Azure data storage, it will simply join the storage account and the location of the blob. The address will be in a .net format.

The ingest interface layer 51 is in communication with the Auto Extraction, Transformation, Loading (ETL) accelerator 70 through the pipeline 50.

Also in communication with the ingest interface layer 51 and the Auto Extraction, Transformation, Loading (ETL) accelerator 50 is a storage layer 55 of the data platform 100. In some embodiments, the storage layer 55 includes a key vault 56, e.g., Azure key fault, and a data lake manager 57.

The key vault 56 is a cloud service for securely storing and accessing sensitive data. Sensitive material is anything that you tightly control access to, such as API keys, passwords, certificates, or cryptographic keys. The key vault 56 service supports two types of containers: vaults and managed hardware security module (HSM) pools. Vaults support storing software and HSM-backed keys, secrets, and certificates. Managed HSM pools only support HSM-backed keys.

The data lake manager 57 is a highly scalable cloud service that allows developers, scientists, business professionals to gain insight from large, complex data sets. As with most data lake offerings, the service is composed of two parts: data storage and data analytics. On the analytics side, users of the Data Lake manager 57 can write their own code to perform specific operational or transactional data transformation and analysis tasks.

In one embodiment, the data lake manager 57 is provided by AZURE™ Data Lake. AZURE™ Data Lake is based on the Apache Hadoop YARN (Yet Another Resource Negotiator) cluster management platform and is intended to scale dynamically across SQL servers.

The data lake is a place to store structured and unstructured data, as well as a method for organizing large volumes of highly diverse data from diverse sources 10. The data lake manager 57 may organize the data that is received from the injest interface layer 51. For example, the data may be organized into layers designated as Bronze/Silver/Gold. Bronze layer data can be raw ingestion data, Silver layer data can be the filtered and cleaned data, and Gold layer data can be business-level aggregates.

Referring to FIG. 2, in some embodiments, the data that has been collected from the sources 10 and introduced to the data platform 100 through the ingest interface layer 51 and stored in the storage 55 can be processed using the preparation and train module layer 58, which includes ELT/ETL and artificial intelligence.

ELT stands for extract, load and transform, while ETL stands for extract, transform and load. ETL loads data first into a staging server and then into a target system, whereas ELT loads data directly into the target system. ETL is generally used for on-premise, relational and structure data. ELT is used for scalable cloud structured and unstructured data sources. ETL is mainly used for small amounts of data, whereas ELT is used for large amounts of data.

The preparation and train layer 58 can also include streaming analytic engines 59. Streaming analytic engines 59 provide for the processing and analyzing of data records continuously rather than in batches. Generally, streaming analytics is useful for the types of data sources that send data in small sizes (often in kilobytes) in a continuous flow as the data is generated. In one embodiment, the streaming analytic engine 59 is provided by AZURE™ Stream Analytics. AZURE™ stream analytics is a real-time analytics and complex event-processing engine that is designed to analyze and process high volumes of fast streaming data from multiple sources simultaneously. Patterns and relationships can be identified in information extracted from a number of input sources including devices, sensors, clickstreams, social media feeds, and applications. These patterns can be used to trigger actions and initiate workflows such as creating alerts, feeding information to a reporting tool, or storing transformed data for later use.

The preparation and train module 58 can also include a cognitive services engine 60, such as AZURE™ Cognitive Services. For example, AZURE™ Cognitive Services is a set of APIs, SDKs and container images that enables developers to integrate ready-made AI directly into their applications. Azure Cognitive Services contains a broad set of capabilities including text analytics; facial detection, speech and vision recognition; natural language understanding, and more.

The preparation and train layer 58 can also include a cognitive match service that can include AZURE™ databricks and APACHE SPARK™. Databricks is a cloud-based data engineering tool used for processing and transforming massive quantities of data and exploring the data through machine learning models. APACHE SPARK™ is a data processing framework that can quickly perform processing tasks on very large data sets, and can also distribute data processing tasks across multiple computers, either on its own or in tandem with other distributed computing tools. These two qualities are key to the worlds of big data and machine learning, which require the marshalling of massive computing power to crunch through large data stores. Spark also takes some of the programming burdens of these tasks off the shoulders of developers with an easy-to-use API that abstracts away much of the grunt work of distributed computing and big data processing.

Other machine learning tools may also be integrated into the preparation and train module 58. "Machine learning" is a method of data analysis that automates analytical model building. It is a branch of artificial intelligence based on systems learning from data, identifying patterns and make decisions with minimal human intervention. Machine learning employs statistical techniques to give computer systems the ability to "learn" (e.g., progressively improve performance on a specific task) with data, without being explicitly programmed. The machine learning method can include decision tree learning, association rule learning, artificial neural networks, deep learning, inductive logic programming, support vector machines, clustering analysis, bayesian networks, reinforcement learning, representation learning, similarity and metric learning, sparse dictionary learning, genetic algorithms, rule-based machine learning, learning classifier systems, and combinations thereof. The remote predictive light setting computing system using machine learning produces a model for providing predictive light characteristics in response to environmental inputs, such as time, weather and calendar date may include a machine learning algorithm that can be selected from the group consisting of: Almeida-Pineda recurrent backpropagation, ALOPEX, backpropagation, bootstrap aggregating, CN2 algorithm, constructing skill trees, dehaene-changeux model, diffusion map, dominance-based rough set approach, dynamic time warping, error-driven learning, evolutionary multimodal optimization, expectation-maximization algorithm, fastICA, forward-backward algorithm, geneRec, genetic algorithm for rule set production, growing self-organizing map, HEXQ, hyper basis function network, IDistance, K-nearest neighbors algorithm, kernel methods for vector output, kernel principal component analysis, leabra, Linde-Buzo-Gray algorithm, local outlier factor, logic learning machine, LogitBoost, manifold alignment, minimum redundancy feature selection, mixture of experts, multiple kernel learning, non-negative matrix factorization, online machine learning, out-of-bag error, prefrontal cortex basal ganglia working memory, PVLV, Q-learning, quadratic unconstrained binary optimization, query-level feature, quickprop, radial basis function network, randomized weighted majority algorithm, reinforcement learning, repeated incremental pruning to produce error reduction (RIPPER), Rprop, rule-based machine learning, skill chaining, sparse PCA, state-action-reward-state-action, stochastic gradient descent, structured kNN, T-distributed stochastic neighbor embedding, temporal difference learning, wake-sleep algorithm, weighted majority algorithm (machine learning) and combinations thereof.

In some examples, the machine learning tools can include MLflow 63. MLflow 63 is an open source platform for managing the end-to-end machine learning lifecycle. It has the following primary components: tracking, models, projects, model registry and model serving. Tracking: Allows you to track experiments to record and compare parameters and results. The models can allow for a user to manage and deploy models from a variety of ML libraries to a variety of model serving and inference platforms. The projects can allow you to package ML code in a reusable, reproducible form to share with other data scientists or transfer to production. The model registry can allow you to centralize a model store for managing models' full lifecycle stage transitions: from staging to production, with capabilities for versioning and annotating. The model serving can allow a user to host MLflow Models as REST endpoints.

The preparation and train layer 58 is in communication with the Auto Extraction, Transformation, Loading (ETL) accelerator 70 and pipeline 50.

Still referring to FIG. 1, the data platform 100 can further include a model, present and consume module layer 64.

The model, present and consume layer 64 can include a database engine layer 65, a semantic layer 66 and a visualization layer 67. The database engine layer 65 can include Azure data explorer 68. Azure Data Explorer 68 is a big data analytics cloud platform and data-exploration service developed that ingests structured, semi-structured (like JSON) and unstructured data (like free-text). The service then stores this data and answers analytic ad hoc queries on it with seconds of latency. It is a full text indexing and retrieval database, including time series analysis capabilities and regular expression evaluation and text parsing.

The database engine layer 65 can include AZURE COSMOS DB™ (Azure Cosmos database (DB)) 69. Azure Cosmos DB 69 can be used within web and mobile applications, and is well suited for modeling social interactions, integrating with third-party services, and for building rich personalized experiences. The Cosmos DB SDKs can be used build rich iOS and Android applications using the popular Xamarin framework.

The database engine layer 65 can also include smartlogic 72. Smartlogic 72 enables organizations to automate knowledgebased tasks using AI and accelerate decision-making by revealing enterprise information that allows the business to take intelligent action.

The database engine 65 can also include a data repository. A data repository is a collection of data in a physically stored location or an assigned data storage location.

The database engine 65 can also include a command and control 71. The command and control 71 works with the auto ETL accelerator 70 to bring all relevant data together in one place to make it actionable—to analyze it and enable executives, managers, and other stakeholders to make informed business decisions based on it.

The model, present and consume layer 64 also includes a semantic layer 66. The semantic layer 66 is a business representation of corporate data that helps end users access data autonomously using common business terms. A semantic layer maps complex data into familiar business terms such as product, customer, or revenue to offer a unified, consolidated view of data across the organization. In some embodiments, the semantic layer 66 includes a tabular model in power BI 73. Power BI 73 is a collection of software services, apps, and connectors that work together to turn your unrelated sources of data into coherent, visually immersive, and interactive insights. Your data may be an Excel spreadsheet, or a collection of cloud-based and on-premises hybrid data warehouses.

The semantic layer 66 and the database engine layer 65 of the model, present and consume layer 65 are in communication with the Auto Extraction, Transformation, Loading (ETL) accelerator 50.

The model, present and consume layer 65 also includes a visualization layer 67. The visualization layer provides the mechanism by which outputs from the data platform 100 are displayed to the user. The visualization layer 67 can provide data outputs using power Bi, which is an interactive data visualization software developed by MICROSOFT® with primary focus on business intelligence. However, any spreadsheet, text based or graphical representation is suitable.

The auto ETL accelerator 70 may be employed as a way to bring all relevant data together in one place to make it actionable—to analyze it and enable executives, managers, and other stakeholders to make informed business decisions based on it. The auto ETL accelerator may be employed in providing data warehousing. A data warehouse is a database where data from various sources is combined so that it can be collectively analyzed for business purposes. ETL is often used to move data to a data warehouse.

Figure 5:
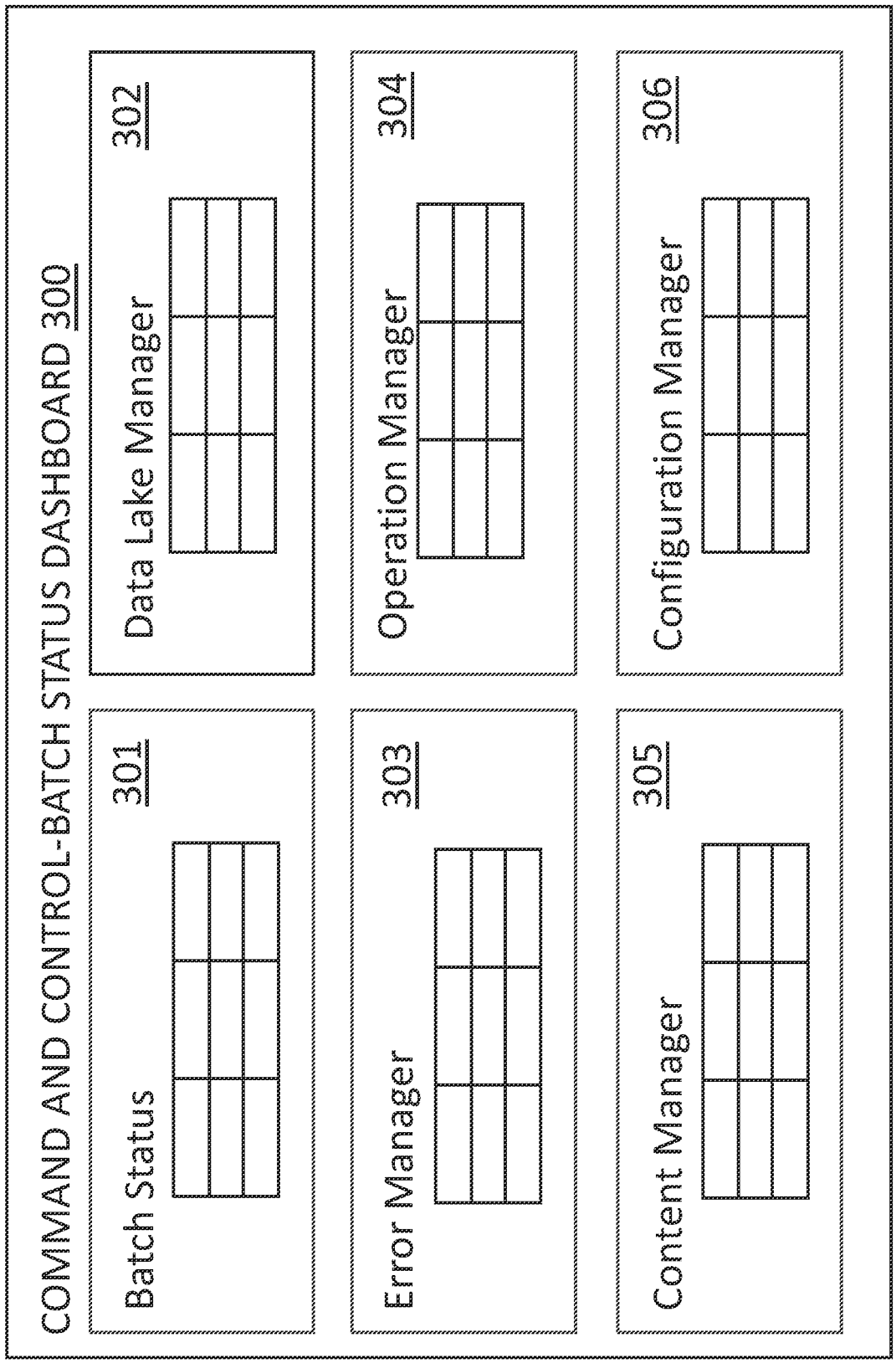
FIG. 5 is a screen shot of a command and control batch status dashboard, in accordance with one embodiment of the present invention.

Prior to the auto ETL accelerator 70, ETL migration would include pipelines for many data operations, e.g., on the order of thousands. For example, thousands of pipelines can delivery the metadata from all the sources 10 described in FIG. 1, as well as provide for the movement of data between different layers of the data platform 100. The movement of the data across the platform would employ a one to one object translation engine. This would result in thousands of pipelines of data. Each data pipeline needing configuration and testing. This results in increased processing time. The methods and systems of the present disclosure employ the auto ETL accelerator 50 to reduce that number of pipelines. The auto ETL accelerator 70 uses translation engine that employs a many to one object translation. For example, the auto ETL accelerator 70 can use 20 data operations pipelines and a data repository. This can be reduced to one data operations pipeline that orchestrates the data operations. The result can be a metadata driven automation (Auto-ETL) that produces less failure points with richer analytics such as a Command-and-Control Batch Status Dashboard 300, as depicted in FIG. 5. The command and control batch status dashboard 300 is enabled through the control and command element 71 of the database engine layer 65 of the model, present and consume layer 64 of the data platform 100. The auto ETL accelerator 50 can provide a reduction in future development and unit testing with less to support resulting in less support FTEs.

FIG. 2 is a flow chart/block diagram illustrating a method for implementing the data platform end to end with auto-ETL accelerator 70.

Block 1 of the method may being with selecting software development operations from a multiplicity of preconfigured existing operations. As noted, the existing Azure data factor (ADF) creates a data pipeline for each dataset that an analytical solution uses. The Auto-ETL accelerator 50 employs the most common operations that a pipeline can use, and then drives those operations using a configuration that was selected by the user. This begins with selecting the most common operations of an data platform 100.

Figure 3:
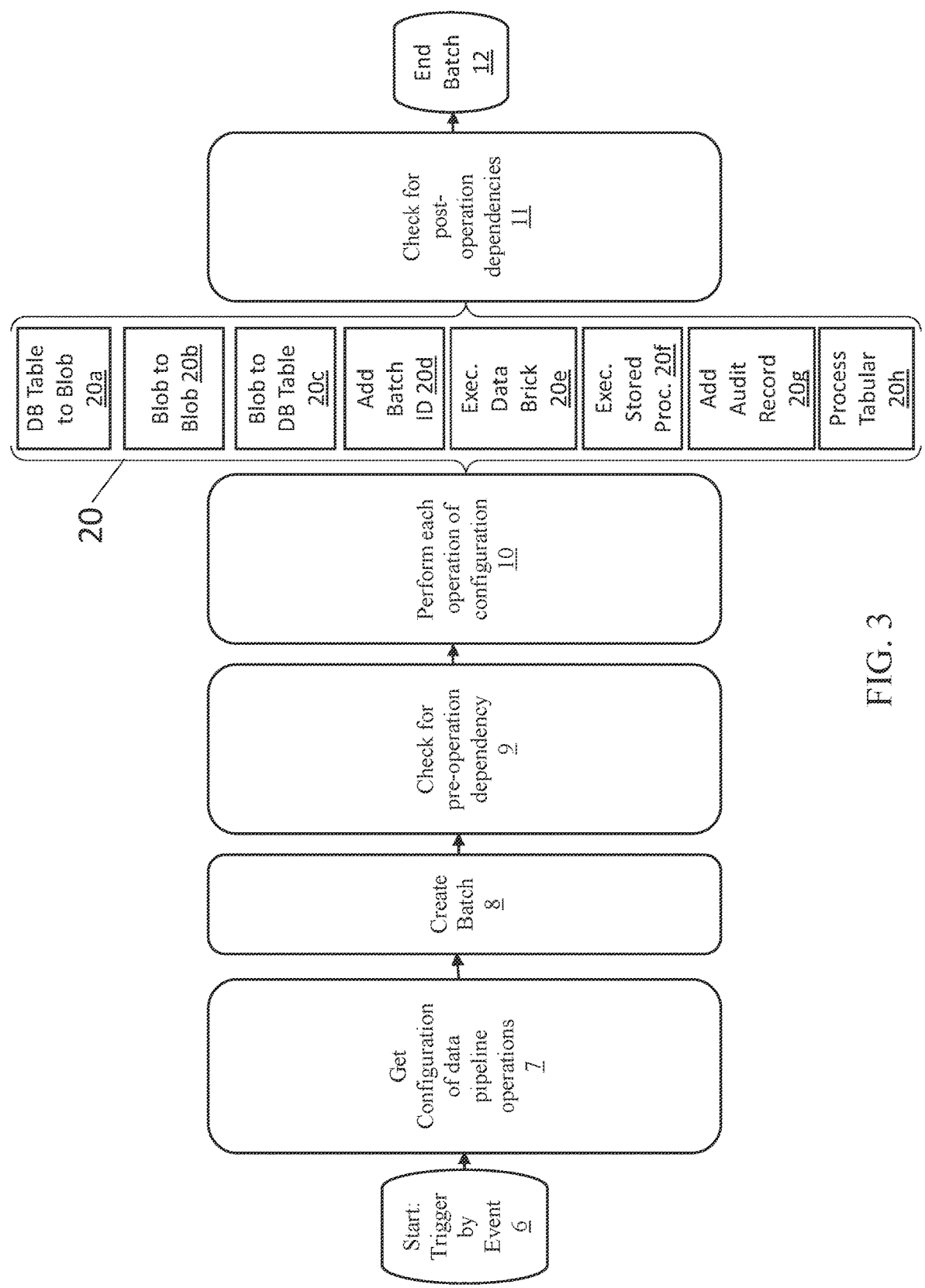
FIG. 3 is a flow chart/block diagram illustrating a command and control process flow for the data platform 100 using the auto-ETL accelerator.

FIG. 3 is a flow chart/block diagram illustrating a command and control process flow for the data platform 100. In the example depicted in FIG. 3, the most common operations are identified by reference number 20. In the example depicted in FIG. 3 there are 10 common operations. However, this is only one example, and it is not necessary that the number of common operations 20 be limited to only 10 common operations. For example, in one configuration there may be 8 common operations. In some examples, the common operations 20 may range from 5 common operations to 15 common operations.

In some embodiments, one set of common operations 20 can include data transfer from a database table to blob (DB Table to Blob 20a), blob to blob (Blob to Blob 20b), and blob to database table (Blob to DB table 20c). Referring back to FIG. 1, in some instances these operations can include movement between the AZURE™ Blob Storage 54 of the injest layer 51, the data lakes correlated to the Data Lake Manager 57 of the store layer 55, and the databases of the data base engine 65. For the operations including DB Table to Blob 20a, Blob to Blob 20b, and Blob to DB table 20c, recording coming into the system are tagged with a batch ID.

Referring to FIG. 3, in some embodiments, the common operations can also include a batch ID operation (Add Batch ID 20d). For example, the batch ID can be assigned for auditing, and the batch ID can be assigned for End to End visibility for anything that touches each record.

Referring to FIG. 3, the common operations can also include executing databricks (Execute Databricks 20e). Referring to FIG. 1, the preparation and train layer 58 of the data platform 100 can also include a cognitive match service that can include databricks. Databricks is a cloud-based data engineering tool used for processing and transforming massive quantities of data and exploring the data through machine learning models.

Referring to FIG. 3, in some embodiments, the common operations can include executing a stored procedure (Execute Stored Procedure 20f), which can be a custom procedure for a user that is using the Data Platform 100. The custom procedure may include any number of the elements in any of the layers of the Data Platform 100. A customer can set up an operation that employs one or more of the elements in the layers of the platform in any sequence.

The common operations can also include adding an audit recording (Add Audit Record 20g). The audit recording can be a way to check data before and after an operation. For example, the number of data entries going into an operation can be the same as data entries out of the operation, and if there is a difference between the number of data entries into and out of the operation that could indicate a problem with the operation. Adding audit records provides for this level of confirmation.

In some embodiments, the common operations can also a process tabular 20h.

It is noted that the embodiment depicted in FIGS. 1 and 3 only represents one embodiment of the present disclosure. It is not intended that the present disclosure be limited to only this example. Any operating including any of the elements depicted in the layers of the application data platform 100, e.g., an operation including transmission of data between elements of the layers in the application data platform 100, may be selected as a common data operation, which can involve a data pipeline 50 for data for an analytical solution in the data platform 100.

Additionally, the operations selected as being common operations that the pipeline 50 may use for the data platform 100 can have up to five different derivatives on how they function.

Referring back to FIG. 1, block 2 of the method can include ordering operations as part of a configuration. In addition to selecting common operations that a pipeline 50 of data can use, the auto ETL accelerator 70 employs a configuration selected by the user to drive the common operation pipelines. In some embodiments, the user selects the configuration, e.g., the order, in which the common operations are executed.

Figure 4:
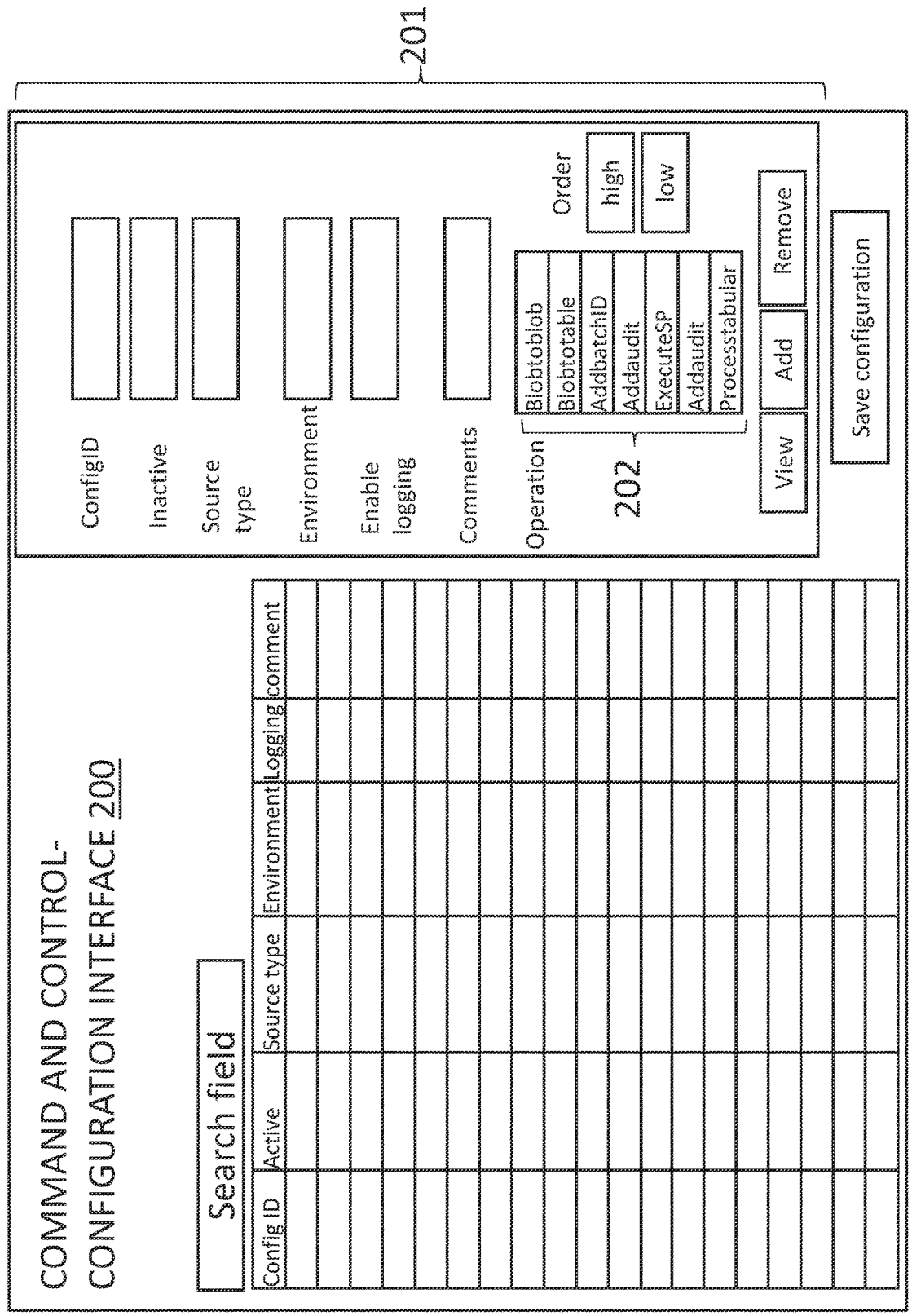
FIG. 4 is a screen shot of a command and control configuration interface though which a configuration of common operations being run in a data platform may be set, in accordance with one embodiment of the present invention.

In some embodiments, the user can enter the desired configuration, e.g., operation order, using a command and control configuration interface 200, as depicted in FIG. 4. The command and control configuration interface 200 may be a graphic user interface that a user may employ to select the order of the common operations 20. In one embodiment, the command and control configuration interface 200 includes a configuration entry field 201. The configuration entry field 201 includes a list of operations 202. The list of operations 202 includes the common operations 20. The command and control configuration interface 200 includes an operation order field 204 for ordering the operations, e.g., ordering the operations higher and lower relative to the other operations in the sequence.

Additionally, the configuration entry field 201 also includes a field for adding or removing operations to be included in the common operations 20. The field for adding or removing operations may be referred to as a common operation defining field 203.

The interface 200 also provides for naming the configuration, and well as a listing of all the saved configurations.

The command and control configuration interface 200 may be provided by the command and control element 71 of the database engine layer 65 of the data platform 100 that is depicted in FIG. 1.

Referring to FIG. 1, in some embodiments, once the common operations are selected, and the configuration is set, the method may continue with Block 3, which can include determining whether dependencies have been met for operations before processing the configuration. By dependency it is meant that a first operation may be dependent upon the processing of data by in a second operation in order to function correctly. If this case the first operation may have a dependency on the second operation. In this case the configuration can not be set so that the first operation is performed before the second operation. This is because the first operation needs data processed by the second operation in order for the first operation to operate correctly, i.e., the first operation has a dependency upon the second operation. At block 3, the method confirms whether the configuration selected by the user provides an order that meets the requirements of the dependencies of the operations.

Blocks 1-3 of the method can be performed when setting up a system for reducing the number of pipelines of data when processing data in the data platform 100. Block 4 and 5 of the method depicted in FIG. 2 describe runtime operations following a sequence when setting up the system for performing the auto ETL accelerator 70. For example, in the method depicted in FIG. 2, the process can continue with generating a batch ID to track the processing at block 4. The batch ID may be assigned to the data being processed through the pipelines 50 when performing operations of the data platform 100. The batch ID facilitates the systems ability to maintain detailed audit trails for the components of the data platform 100. The auto ETL accelerator 70 can capture batch level audit trails to track status of the data processing pipelines.

FIG. 5 is a screen shot of a command and control batch status dashboard 300. The auto ETL accelerator 70 can capture batch level audit trails to track status of the data processing pipelines, which can be displayed on the command and control batch status dashboard 300. Referring to the dashboard 300 depicted in FIG. 5, the information provided can include: 1) data progress through the processing pipeline 301, 2) error handling and status 302, 3) file location in the data lake 303, 4) configuration used to process the data set 304, 5) operations performed on the dataset 305, and 6) content auditing through aggregated metrics 306.

Referring back to FIG. 2, block 5 of the method can include performing operations can then be performed in the order specified in the configuration.

The auto ETL accelerator 70 operates in performing the operations by reducing the number of pipelines for delivering data. The auto ETL accelerator 70 take the most common operations, e.g., the ten most common operations, that a pipeline case use, and drives it by a configuration eliminating the need for development and a lot of the testing. Additionally, these operations employ as being most common can have derivatives on how they function. For example, five derivatives on each of the common operations 20 based on how they function can be employed in the auto ETL accelerator 70. The auto ETL accelerator 70 described herein solves the complexity of the need to develop and test a new pipeline when introducing new datasets to analytical solutions. In some embodiments, the auto ETL accelerator 70 eliminates the need to repetitively create new pipelines over and over again. The auto ETL accelerator also reduces the need for maintenance because the logic is in a finite set of Azure Data Factory (ADF) pipelines that control many datasets that flow through the AZURE™ data platform ecosystem.

Performing operations with the auto ETL accelerator 70 in accordance with the method described in FIG. 2 may be employed in providing machine learning and artificial intelligence. Machine learning (ML) is a way of making sense of data without explicitly programming analytical models. Instead, the system learns from data using artificial-intelligence techniques. ETL can be used to move the data into a single location for ML purposes.

Performing operations with the auto ETL accelerator 70 in accordance with the method described in FIG. 2 may be employed in marketing data integration. Marketing data integration involves moving all your marketing data—such as customer, social networking, and web-analytics data-into one place, so you can analyze it and develop future plans. ETL is used to collect and prepare marketing data.

Performing operations with the auto ETL accelerator 70 in accordance with the method described in FIG. 2 may be employed in marketing internet of things (IoT) data integration. IoT is the collection of connected devices capable of gathering and transmitting data through sensors embedded in hardware. IoT devices can include factory equipment, network servers, smartphones, or a broad range of other machines—even wearables and implanted devices. ETL helps move data from multiple IoT sources to a single place where you can analyze it.

In some embodiments, the auto ETL accelerator 70 may be used for database replication. Database replication takes data from your source databases—like Oracle, Cloud SQL for MySQL, MICROSOFT® SQL Server, Cloud SQL for PostgreSQL, MongoDB, or others—and copies it into a cloud data warehouse.

In some embodiments, the auto ETL accelerator 70 may be used for cloud migration. Companies are moving their data and applications from on-premises to the cloud to save money, make their applications more scalable, and secure their data, and the ETL accelerator described herein can be used to run these migrations.

It is noted that the method described with reference to FIG. 2 only illustrates one embodiment for the method of using a data platform, e.g., an Azure data platform as depicted in FIG. 1, end to end using an accelerator having auto ETL, as described above.

Further description is provided with reference to FIG. 3. FIG. 3 is a flow chart/block diagram illustrating a command and control process flow for the data platform 100. In the process flow described in FIG. 3, the configuration of the common data operations 20 has already been performed, such as described by the embodiments consistent with blocks 1, 2 and 3 of FIG. 2. The command and control process flow that is depicted in FIG. 3 functions in combination of a database scheme as depicted in FIG. 6, ADF pipelines 50 of the data platform 100 depicted in FIG. 1, and the stored procedures for the configuration, e.g., order, of common operations 20, as described by blocks 1, 2 and 3 of FIG. 2.

In FIG. 3 the command and control for the data platform 100 can begin with block 6, which includes trigger to start the auto ETL accelerator 70. The trigger can be a pull or push of data. For example, the trigger can be scheduled pull of data. The trigger can also be the occurrence of a file being uploaded to the data platform 100 that is to be processed by an operation.

Figure 6:
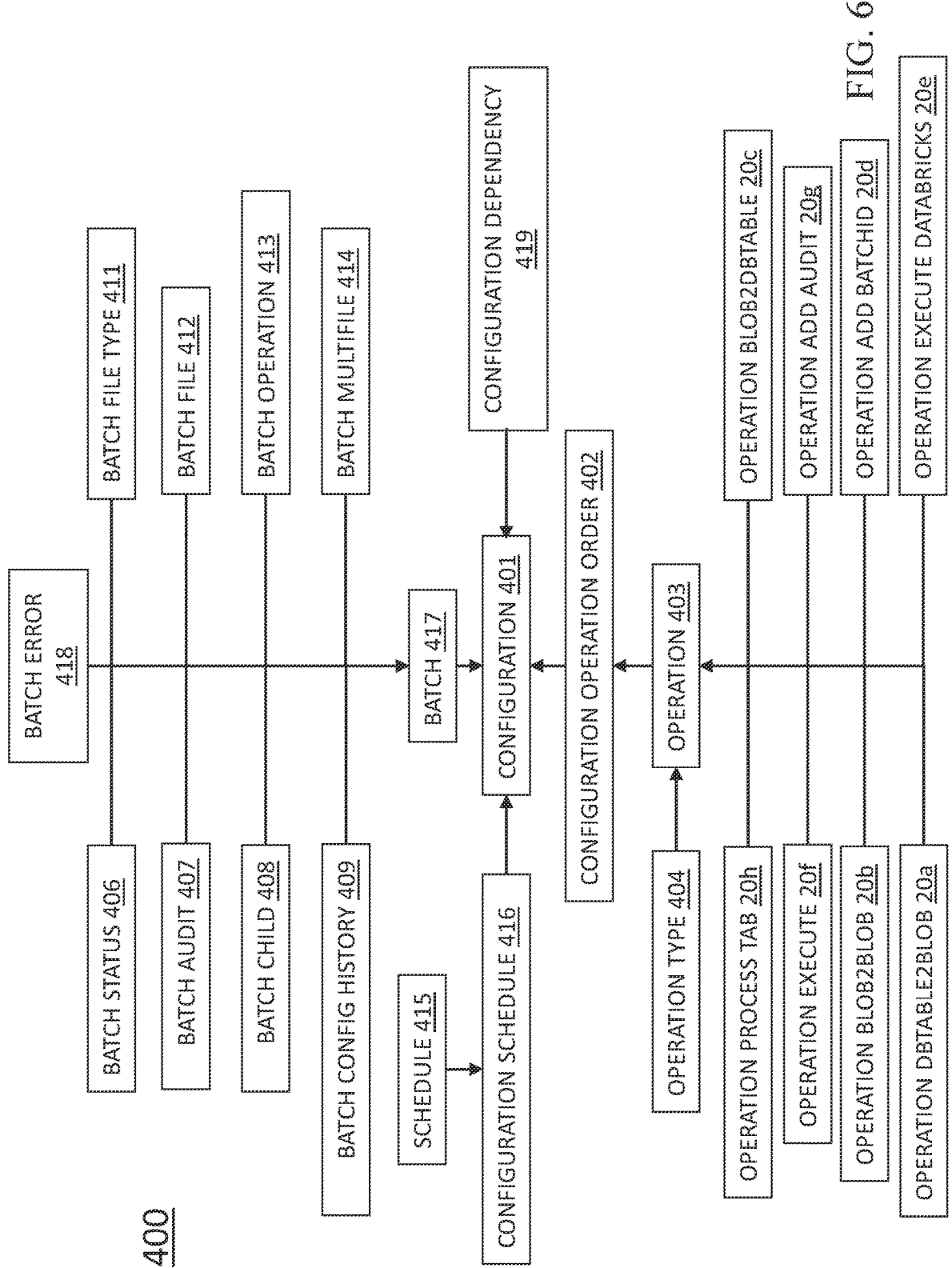
FIG. 6 is an illustration of a database scheme for implementing a data platform end to end with auto-ETL accelerator, in accordance with one embodiment of the present disclosure.

Referring to FIG. 6, in some embodiments, the schedule 45 for when the data is pulled or pushed through the data platform 100 is stored in the data scheme 400. The data scheme 400 that is depicted in FIG. 6 includes a schedule 415 and schedule configuration 416, which is being fed into the configuration 400 being used by the ETL accelerator 70.

Following the trigger to start the auto ETL accelerator 70, the process continues with block 7. Block 7 includes receiving the configuration of the data pipeline operations. As described with reference to blocks 1 and 2 of the method described in FIG. 2, common operations 20 are selected for reducing the number of pipelines of data, and the common operations are then configured, as selected by the user. The configuration may be stored in the configuration 401 (memory for saving configurations) of the database scheme 400. The database scheme 400 for the auto ETL accelerator 70 can be saved in the database engine layer 65 of the database platform 100. More specifically, the database scheme 400 may be saved in the command and control 71 of the database engine layer 65.

FIG. 6 is an illustration of a database scheme 400. The batabase scheme 400 is employed by the command and control element 71 of the database engine layer 65 of the Database Platform 100. The database scheme 400 includes the configuration 401 that is pulled by the auto ETL accelerator 50 in configuration pipelines for data transportation through the auto ETL accelerator 50. The configuration 401 includes instructions on the configuration operations order 402. The configuration operations order 402 includes the order that was set by the user at block 2 of the method described in FIG. 2. As noted above, FIG. 4 provides an example of a graphic user interface, e.g., command and control configuration interface 200, through which the order of operations can be set. The operations 403 in the order of operations is the saved commonly used operations that was set at block 1 of FIG. 2. The operations having reference numbers 20*a*, 20*b*, 20*c*, 20*d*, 20*e*, 20*f*, 20*g*, 20*h* in FIG. 6 have been described for the elements having the same reference numbers in FIG. 3. As noted the operations 20*a*, 20*b*, 20*c*, 20*d*, 20*e*, 20*f*, 20*g*, 20*h* are stored in the database scheme 400 because they are common operations. The operation module 403 of the database scheme 400 also includes type data from the operation type module 404.

Referring back to FIG. 3, in a following step, the process flow can continue with creating and starting a batch at block 8, which includes assigning a batch ID. A batch ID is created to keep track of the data in the batch, and to keep track of the processing of the data from end to end. The information being tracked using the batch ID can be displayed in the batch status dashboard 300 depicted in FIG. 5. As noted, the batch status dashboard 300 includes a batch status field 301, which indicates that the batch operation failed or succeeded. The batch status dashboard 300 also includes fields for a data lake manager 303, error manager 302, operation manager 305, content auditing 306 and configuration manager 304. Tracking all of this information for display to the user can begin with assigning the batch ID at block 7.

Further, the database scheme 400 also includes modules for the batch information tracked using the batch ID, e.g., batch 417. The batabase scheme 400 is employed by the command and control element 71 of the database engine layer 65 of the AZURE™ Database Platform 100. The database scheme 400 include a batch command and control module having reference number 405 for the batch status dashboard 300. The batch command and control module 405 is in communication with a batch status command and control module 406, batch audit command and control module 407, batch child command and control module 408, batch configuration history command and control module 409, batch error command and control module 410, batch file type command and control module 411, batch file command and control module 412, batch operation command and control module 412, a batch operation command and control module 413 and a batch multifile command and control module 414, as well as batch error 417. All of these modules supporting the batch status data being displayed on the batch status dashboard 300.

Referring back to FIG. 3, in a following step, the method may continue with block 9. Block 9 can include checking for dependencies, and pausing the process to correct when the order specified by the configuration ID does not meet the requirements of the dependencies. Checking the dependencies at this stage of the process flow may be referred to as the pre-operation dependencies. The database scheme 400 also includes modules, e.g., the configuration dependency command and control module 419, for the required dependencies of the operations. The batabase scheme 400 is employed by the command and control element 71 of the database engine layer 65 of the Azure Database Platform 100.

Once, the order of operations for the configuration ID obtained at block 7 is confirmed to not have any dependency restrictions, the method may continue to block 10 of FIG. 3. Block 10 of FIG. 3 includes performing each of the operations in the order specified in the configuration. By using the preselected operations, e.g., 10 preselected operations, such as data transfer from a database table to blob (DB Table to Blob 20a), data transfer from blob to blob (Blob to Blob 20b), data transfer from a blob to database table (Blob to DB table 20c), data transfer with a batch ID operation (Add Batch ID 20d), data transfer for executing databricks (Execute Databricks 20e), data transfer for executing a stored procedure (Execute Stored Procedure 20f), and data transfer for audit recording (Add Audit Record 20g), with the configuration, e.g., order of operations, selected by the user (as described in blocks 1-3 of FIG. 2), the auto ETL accelerator 50 reduces the number of data pipelines when compared to prior methodologies. For example, while existing pipelines for data operations employ thousands of pipelines resulting from a one to one methodology, the translation engine of the present invention provide a many to one object translation. This results in the data operations pipelines being reduced, e.g., to 20 pipelines or less with a metadata repository. In some embodiments, the methods, systems and computer program products of the present disclosure can reduce data transfer to one main pipeline that orchestrate the data operations pipeline. In some embodiments, the methods, systems and computer program products of the present disclosure can provide a metadata driven automation (Auto-ETL) giving less failure points with richer analytics such as the Command-and-Control Batch Status Dashboard 300.

Referring to FIG. 3, in some embodiments, for the operations 20a, 20b, 20c, 20d, 20e, 20f, 20g, 20h the records coming into the system are tagged with the batch ID. The batch ID can provide two functions. For example, the batch ID can be used for tracking data during auditing, and for end to end visibility.

At block 11 of FIG. 3, following running of the applications, post operation dependency is checked. For example, post operation dependency handling can include loading multiple concurrent files. Once completed, the method may start a new batch to merge the files and finish the processing.

The batch of data being processed in the method that is depicted in FIG. 3 can then end at block 12.

Figure 7:
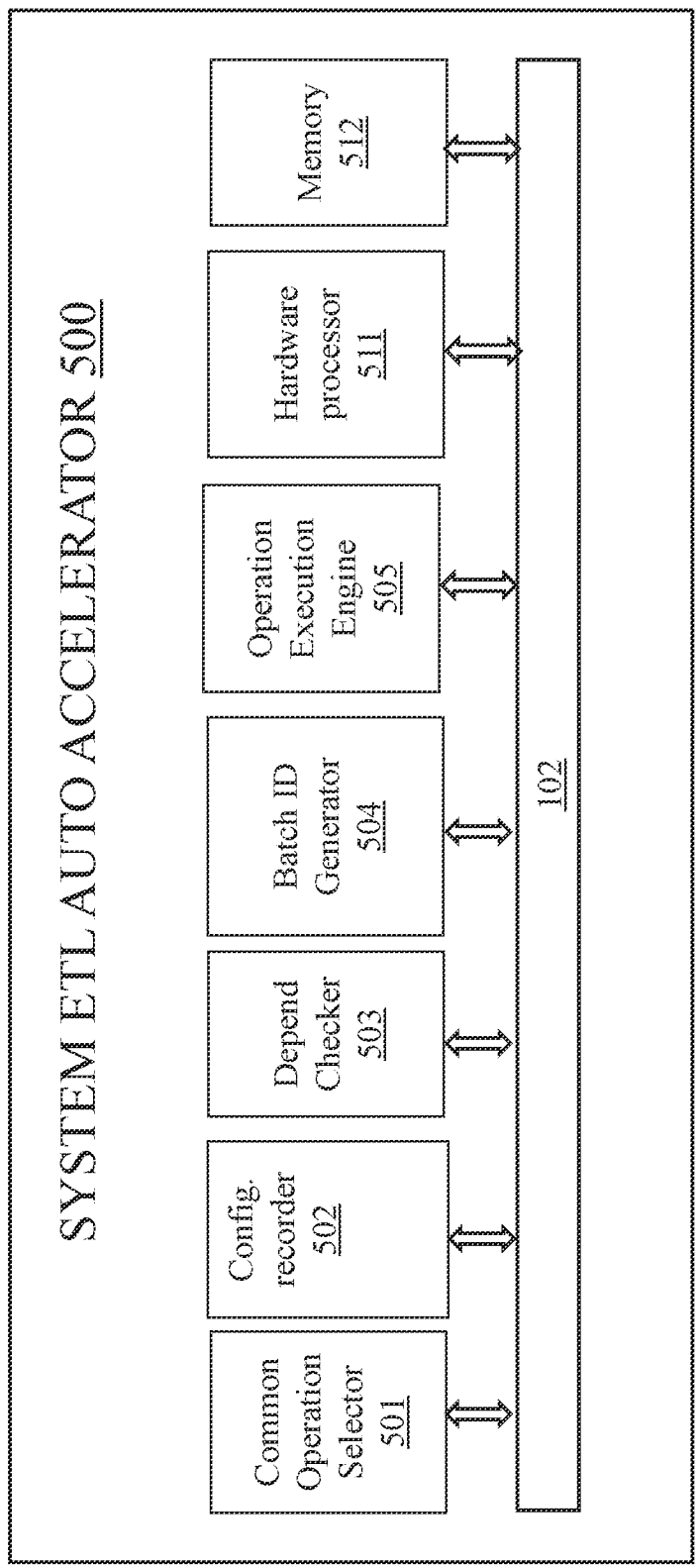
FIG. 7 is a flow chart/block diagram illustrating a system for a data platform end to end with auto-ETL accelerator, in accordance with one embodiment of the present disclosure.

FIG. 7 is a block diagram illustrating a system 500 for providing a software development accelerator tool (ETL accelerator 70) that can be employed for building, testing, deploying and managing software applications and services. The system can include a hardware processor 511; and a memory 512 that stores a computer program product. The computer program product when executed by the hardware processor 511, causes the hardware processor 511 to select software development operations from a multiplicity of preconfigured existing operations, and then order the operations as part of a configuration. The software development operations can be selected using a module for common operation selector 501. Further details for common operation selector 501 have been described above with reference to block 1 of the method described with reference to FIG. 2. The order of operations can be performed using a configuration recorder 502. The configuration recorder can execute the method steps described with reference to block 2 of FIG. 2, and may use the command and control configuration interface 200 that is described with reference to FIG. 4. The computer program product executed by the system depicted in FIG. 7 can also determine whether the dependencies for operations have been met before processing the configuration. This step can be performed using the dependency checker 503. The dependency checker 503 can perform functions similar to those described with reference to block 3 of FIG. 2 and block 9 of FIG. 3. Still referring to FIG. 7, the system 500 can further generate a batch ID to track the processing using the batch ID generator 504. Operations can then be performed in the order specified in the configuration using the operation execution engine 505. The function of the operation execution engine 505 have been further described in description of blocks 5 and 10 of the process flows depicted in FIGS. 2 and 3.

Figure 8:
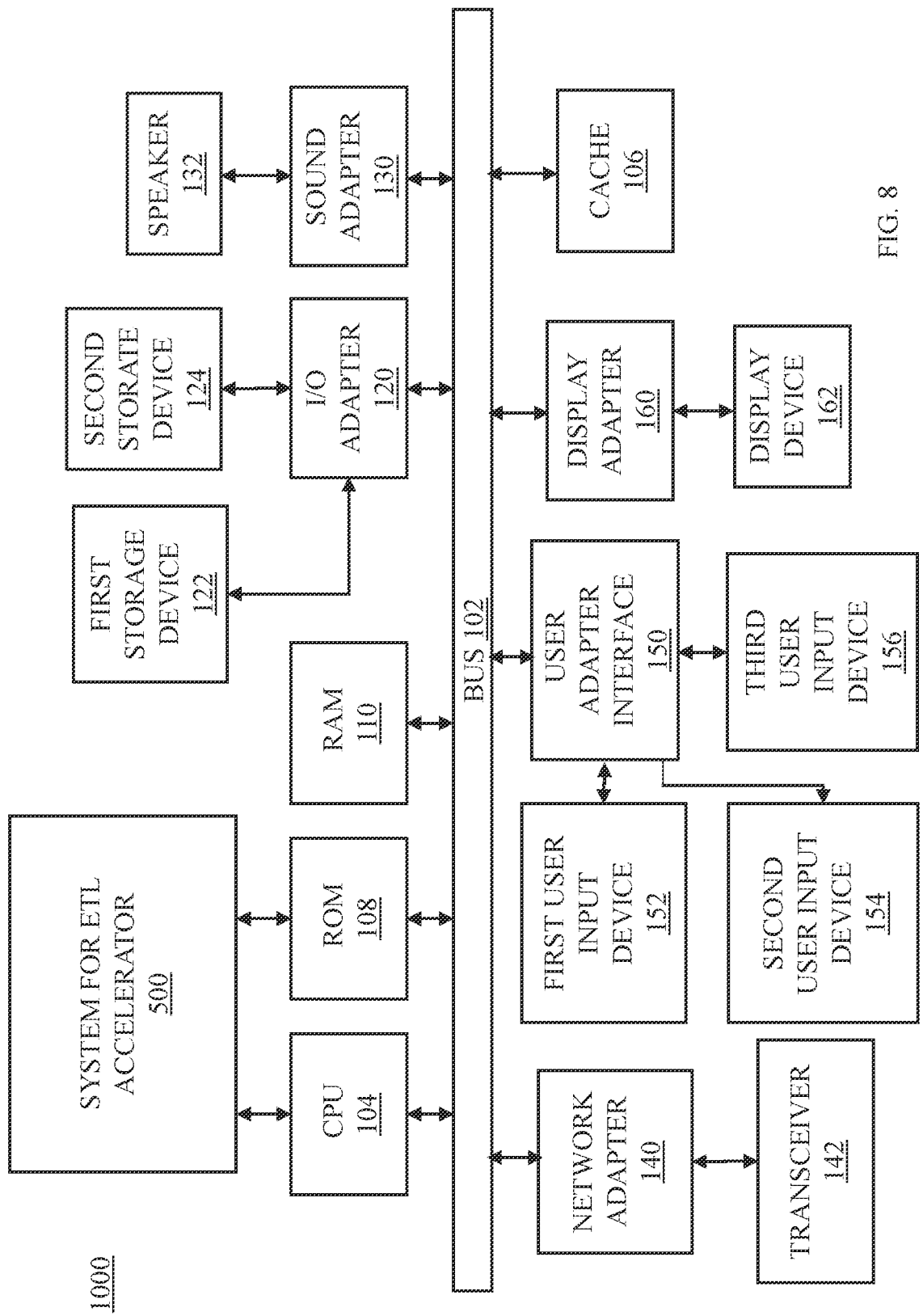
FIG. 8 is a block diagram illustrating a system that can incorporate the auto-ETL accelerator that is depicted in FIG. 7, in accordance with one embodiment of the present disclosure.

FIG. 8 further illustrates a processing system 1000 that can integrate (e.g., via bus 102) the system 500 for providing a software development accelerator tool (ETL accelerator 70) that can be employed for building, testing, deploying and managing software applications and services. The exemplary processing system 1000 to which the present invention may be applied is shown in accordance with one embodiment. The processing system 1000 includes at least one processor (CPU) 104 operatively coupled to other components via a system bus 102. The system bus 102 may be in communication with the system 400 depicted in FIG. 7. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 1000.

Of course, the processing system 1000 may also include other elements (not shown), as readily contemplated by one of skill in the art, as well as omit certain elements. For example, various other input devices and/or output devices can be included in processing system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 1000 are readily contemplated by one of ordinary skill in the art given the teachings of the present invention provided herein.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The present invention may be a system, a method, and/or a computer program product at any possible technical detail level of integration. For example, in some embodiments, a computer program product is provided for a software development accelerator tool that can be employed for building, testing, deploying and managing software applications and services. The computer program product can include a computer readable storage medium having computer readable program code embodied. The program instructions are executable by a processor to cause the processor to select software development operations from a multiplicity of preconfigured existing operations, and then order the operations as part of a configuration. The computer program product can also determine, using the processor, whether dependencies are met for operations before processing the configuration; and generate a batch ID to track the processing. Operations can then be performed using the processor in the order specified in the configuration.

The computer program product may include a computer readable storage medium (or media) having computer readable program instructions thereon for causing a processor to carry out aspects of the present invention. The computer program produce may also be non-transitory.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (IoT)) now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (Saas): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 9:
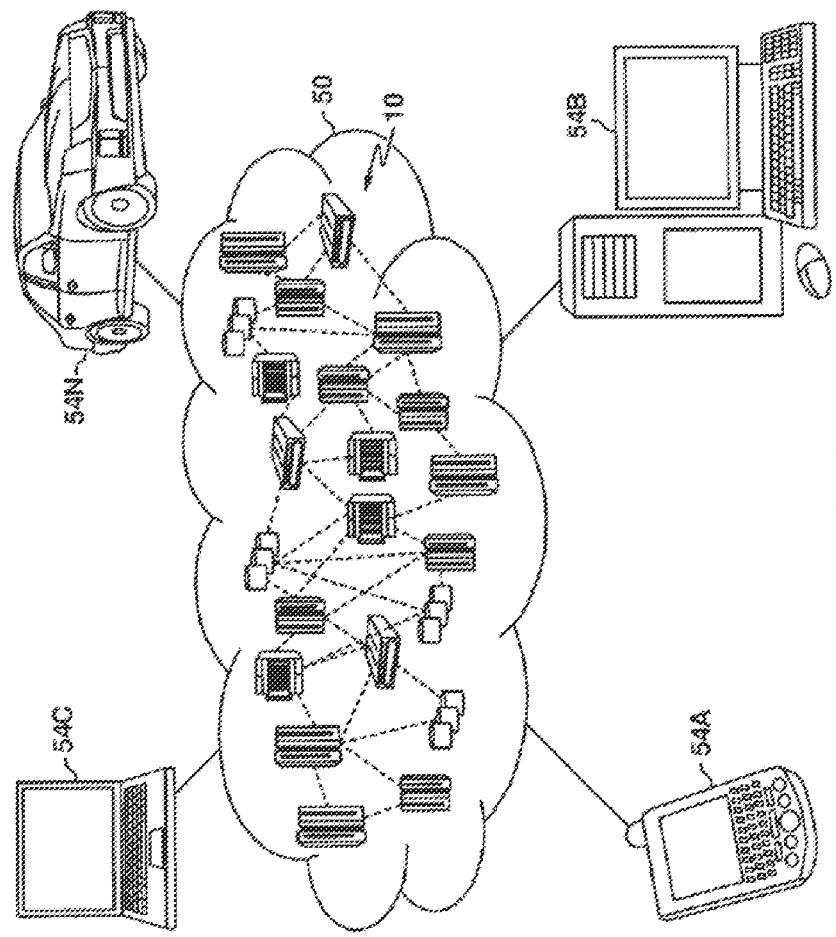
FIG. 9 depicts a cloud computing environment according to an embodiment of the present disclosure.

Referring now to FIG. 9, illustrative cloud computing environment is depicted. As shown, cloud computing environment includes one or more cloud computing nodes with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 10:
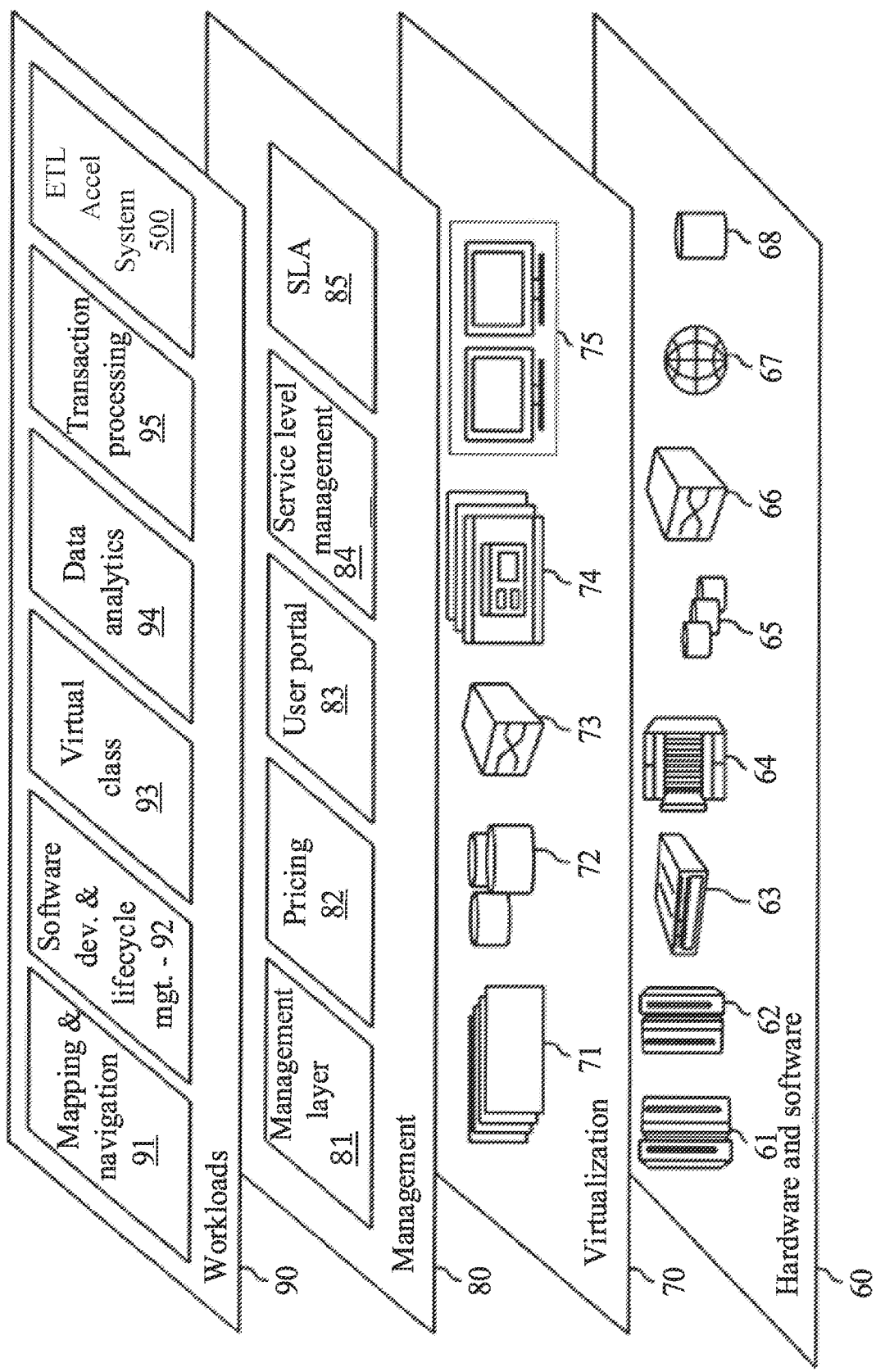
FIG. 10 depicts abstraction model layers according to an embodiment of the present disclosure.

Referring now to FIG. 10, a set of functional abstraction layers provided by cloud computing environment (see FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a system 500 for providing a software development accelerator tool (ETL accelerator 70) that can be employed for building, testing, deploying and managing software applications and services, in accordance with FIGS. 1-10.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for a data platform end to end with an auto ETL accelerator (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for a software development accelerator tool comprising:
    selecting operations from a multiplicity of preconfigured existing operations through a database engine layer of a distributed computing environment;
    ordering the operations selected as part of a configuration;
    determining whether dependencies are met for the operations selected before processing the configuration;
    tracking the processing of the operations selected in the configuration by generating a batch identification (ID) through the database engine layer of the distributed computing environment; and
    performing operations with a data pipeline in the order specified in the configuration, the data pipeline being applied to a plurality of different data sets from different sources.

2. The computer implemented method of claim 1, wherein the operations selected from the multiplicity of preconfigured existing operations are selected from the group consisting of database table to blob data transfer, blob to database table data transfer, blob to blob data transfer, batch ID data, executing a databrick, executing a stored procedure, add audit records, processing tabulars and combinations thereof.

3. The computer implemented method of claim 1, wherein the selecting of operations includes a plurality ranging in number from 5 operations to 15 operations.

4. The computer implemented method of claim 1 further comprising following the performing of the operations confirming whether a post operation dependency is to be performed.

5. The computer implemented method of claim 1, wherein ordering operations of a configuration comprises a sequence of the operations selected meeting the dependencies.

6. The computer implemented method of claim 1, wherein the batch ID provides for auditing being displayed to a user by a batch status dashboard.

7. The computer implemented method of claim 1, wherein the operations are performed in a data platform of a cloud environment.

8. A system for a software development accelerator tool comprising:
- a hardware processor; and
- a memory that stores a computer program product, the computer program product when executed by the hardware processor, causes the hardware processor to:
- select operations from a multiplicity of preconfigured existing operations through a database engine layer of a distributed computing environment;
- order the operations as part of a configuration;
- determine whether dependencies are met for the operations before processing the configuration;
- track the processing of the operations selected in the configuration by generating a batch identification (ID) through the database engine layer of the distributed computing environment; and
- perform the operations with a data pipeline in the order specified in the configuration, the data pipeline being applied to a plurality of different data sets from different sources.

9. The system of claim 8, wherein the operations selected from the multiplicity of preconfigured existing operations are selected from the group consisting of database table to blob data transfer, blob to database table data transfer, blob to blob data transfer, batch ID data, executing a databrick, executing a stored procedure, add audit records, processing tabulars and combinations thereof.

10. The system of claim 8, wherein the selecting of operations includes a plurality ranging in number from 5 operations to 15 operations.

11. The system of claim 8 further comprising following the performing of the operations confirming whether a post operation dependency is to be performed.

12. The system of claim 8, wherein ordering operations of a configuration comprises a sequence of the operations selected meeting the dependencies.

13. The system of claim 8, wherein the batch ID provides for auditing being displayed to a user by a batch status dashboard.

14. The system of claim 8, wherein the operations are performed in a data platform of a cloud environment.

15. A computer program product for a software development accelerator tool comprising a computer readable storage medium having computer readable program code embodied therewith the program instructions executable by a processor to cause the processor to:
- select, using the processor, operations from a multiplicity of preconfigured existing operations through a database engine layer of a distributed computing environment;
- order, using the processor, the operations as part of a configuration;
- determine, using the processor, whether dependencies are met for the operations before processing the configuration;
- track, using the processor, the processing of the operations selected in the configuration by generating; a batch identification (ID) through the database engine layer of the distributed computing environment; and
- perform, using the processor, the operations with a data pipeline in the order specified in the configuration, the data pipeline being applied to a plurality of different data sets from different sources.

16. The computer program product of claim 15, wherein the operations selected from the multiplicity of preconfigured existing operations are selected from the group consisting of database table to blob data transfer, blob to database table data transfer, blob to blob data transfer, batch ID data, executing a databrick, executing a stored procedure, add audit records, processing tabulars and combinations thereof.

17. The computer program product of claim 15 further comprising following the performing of the operations confirming whether a post operation dependency is to be performed.

18. The computer program product of claim 15, wherein ordering operations of a configuration comprises a sequence of the operations selected meeting the dependencies.

19. The computer program product of claim 15, wherein the batch ID provides for auditing being displayed to a user by a batch status dashboard.

20. The computer program product of claim 15, wherein the operations are performed in a data platform of a cloud environment.

* * * * *